(12) United States Patent
Biffle et al.

(10) Patent No.: US 9,135,414 B1
(45) Date of Patent: Sep. 15, 2015

(54) SOFTWARE FAULT ISOLATION FOR ARM THUMB

(75) Inventors: Cliff L. Biffle, Berkeley, CA (US);
David C. Sehr, Cupertino, CA (US);
Bennet S. Yee, Mountain View, CA (US)

(73) Assignee: Google Inc., Mountain View, CA (US)

( * ) Notice: Subject to any disclaimer, the term of this patent is extended or adjusted under 35 U.S.C. 154(b) by 587 days.

(21) Appl. No.: 13/592,260

(22) Filed: Aug. 22, 2012

(51) Int. Cl.
*G06F 21/12* (2013.01)

(52) U.S. Cl.
CPC ............ *G06F 21/128* (2013.01); *G06F 21/121* (2013.01)

(58) Field of Classification Search
CPC ............ G06F 11/3636; G06F 11/3648; G06F 9/3017; G06F 9/30174; G06F 11/3466; G06F 21/12; G06F 21/128
See application file for complete search history.

(56) References Cited

U.S. PATENT DOCUMENTS

2011/0029961 A1 2/2011 Muth et al.

OTHER PUBLICATIONS

Ansel et al., "Language-Independent Sandboxing of Just-In-Time Compilation and Self-Modifying Code," ACM SIGPLAN Conference on Programming Language Design and Implementation (PLDI), 2011, 12 pages.
Sehr et al., "Adapting Software Fault Isolation to Contemporary CPU Architectures," 19th USENIX Security Symposium, 2010, 11 pages.
Yee et al., "Native Client: A Sandbox for Portable, Untrusted x86 Native Code," IEEE Symposium on Security and Privacy (Oakland '09), 2009, 15 pages.

*Primary Examiner* — Farley Abad
(74) *Attorney, Agent, or Firm* — Fish & Richardson P.C.

(57) ABSTRACT

Methods, systems, and apparatus, including computer programs encoded on a computer storage medium, for executing native code modules. One of the methods includes for executing a native code module includes obtaining the native code module, wherein instructions in the native code module are encoded by variable-length encoding; loading the native code module into a secure runtime environment for an ARM instruction set architecture; and safely executing the native code module in the secure runtime environment using software fault isolation (SFI) mechanisms.

19 Claims, 4 Drawing Sheets

SOFTWARE FAULT ISOLATION FOR ARM THUMB

BACKGROUND

This specification relates to techniques for safely executing native code modules, and particularly to safe execution of Thumb based native code modules within ARM instruction set architectures.

Often users attempt to execute machine code of unknown provenance on their computer devices. Installing and executing such native applications may produce unwanted side effects, for example, by modifying files on the computing device or engaging in computation or communication outside of the tasks or features requested by the user.

SUMMARY

In general, one innovative aspect of the subject matter described in this specification can be embodied in methods for executing a native code module that include the actions of obtaining the native code module, wherein instructions in the native code module are encoded by variable-length encoding; loading the native code module into a secure runtime environment for an ARM instruction set architecture; and safely executing the native code module in the secure runtime environment using software fault isolation (SFI) mechanisms by: constraining store instructions in the native code module; maintaining control flow integrity for the native code module by dividing a code region associated with the native code module into 16-byte code blocks comprising 8 2-byte slots, wherein a first slot of each code block contains at least the first 16 bits of a permitted instruction; and when a particular code block includes a slot containing an unconditional control flow instruction, all instructions contained in slots between a first slot of the particular code block and the slot containing unconditional control flow instruction are permitted instructions. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other aspects can optionally include one or more of the following features. Maintaining control flow integrity further includes blocking exchange branch instructions intended for switching away from variable-length encoding mode. A portion of the particular code block between the unconditional control flow instruction and an end of the particular code block contains data. At least one of the code blocks is a data code block comprising 14 bytes of data and a two-byte branch instruction linking the data code block to another data code block. The method further includes validating the native code module wherein validator is configured to accommodate the instructions in the native code module encoded by the variable-length encoding by applying the software fault isolation (SFI) mechanisms to the native code module. Safely executing the native code module further comprises at least one of following: preventing the instructions in the native code module from altering R9; allowing alterations to stack pointer (R13) only to a valid data address; and allowing alterations of link register (R14) only to a valid bundle address. Safely executing the native code module further includes at least one of following: blocking instructions to compute an address by adding registers; blocking instructions to call an operating system; blocking instructions to switch away from variable-length encoding mode; and blocking instructions to load data into program counter (R15). Safely executing the native code module further includes replacing at least one of the following instructions with corresponding statically-safe sequences of instructions: write-to-memory instructions; indirect branch instructions; and table-offset branch instructions. Safely executing the native code module further includes at least one of the following: masking direct updates to stack pointer (R13) by clearing a set of upper bits in each of the destination addresses; and masking destination addresses associated with indirect control flow instructions by clearing a set of upper bits and a set of lower bits in each of the destination addresses.

Particular implementations of the subject matter described in this specification can be implemented to realize one or more of the following advantages. Native modules encoded with variable-length instruction encoding, for example the Thumb instruction set for ARM processors, can be safely executed. This allows for safe execution of untrusted code modules providing higher code density and better cache, translation lookaside buffer, and paging performance relative to fixed-length ARM encoding.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Example implementations provide a method and system for safely executing a native code module. The native code module contains native code that is executed within a secure runtime environment. The secure runtime environment isolates the native code module from sensitive data and resources on the computing system. In some implementations, the native code module is validated by a validator prior to execution within the secure runtime environment to ensure that the native code module complies with a set of security constraints. The native code module can be used to perform computationally intensive operations for a web application executing within a web browser.

More specifically, some implementations provide a method and system for maintaining security for the native code module within an ARM instruction set architecture (ISA). Particularly, example implementation describes specific mechanisms for handling of variable-length instruction encoding, for example using a Thumb instruction set for ARM processors, e.g., Thumb, Thumb-2.

To maintain security, the validator and/or secure runtime environment provides a set of software fault isolation (SFI) mechanisms that maintain control flow integrity and constrain store instructions in the native code module. Control flow integrity is maintained by dividing a code region associated with the native code module into code blocks and data blocks, starting the data blocks with illegal instructions, validating direct control flow instructions, and masking destination addresses associated with indirect control flow instructions. Store instructions may be constrained by enforcing storage of valid data addresses in a stack pointer, and/or masking non-stack-relative store instructions. Consequently, implementations may provide per-thread protection with low performance overhead during execution of native code modules while maintaining platform independence and portability across different web browsers and operating systems.

Figure 1:
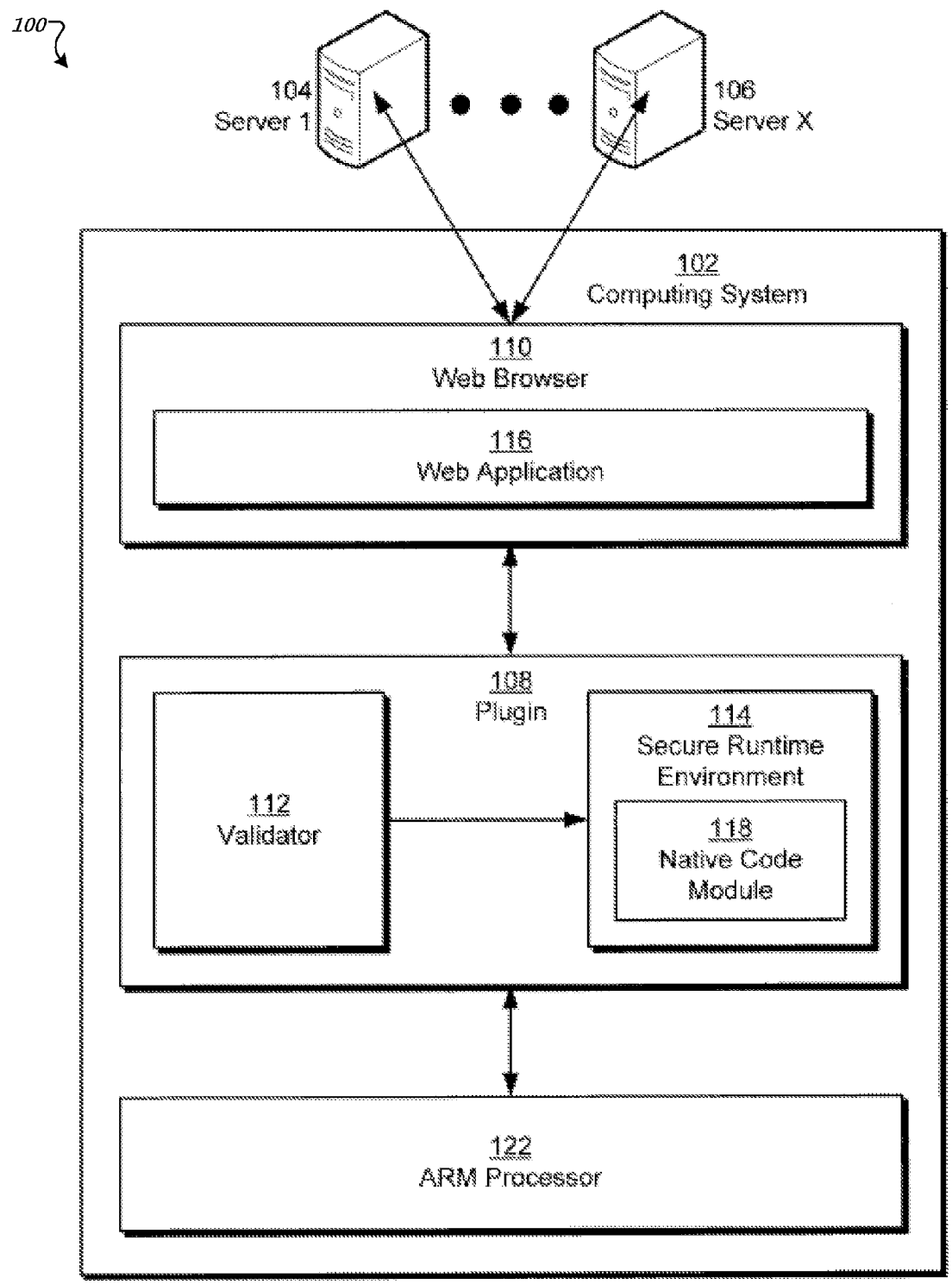
FIG. 1 shows a schematic of an example system.

FIG. 1 shows a schematic of an example system 100. System 100 includes a computing system 102 and multiple servers, e.g., server 1 104, server x 106. The computing system 102 includes a web application 116 running within a web browser 110, a plugin 108, and an ARM processor 122. Each of these components is described in further detail below.

The computing system 102 can be an electronic device that provides one or more services or functions to a user. For example, the computing system 102 may can be a mobile phone, desktop or laptop computer, global positioning system (GPS) receiver, portable media player, personal digital assistant (PDA), or tablet computer.

In addition, the computing system 102 may include an operating system (not shown) that coordinates the use of hardware and software resources on computing the system 102, as well as one or more applications, e.g., web browser 110 and web application 116, that perform specialized tasks. For example, the computing system 102 can include applications such as an e-mail client, address book, document editor, web browser, and/or media player. To perform tasks for the user, applications may obtain the use of hardware resources, e.g., the ARM processor 122, memory, I/O components, network interface card, or graphics-processing unit (GPU), on the computing system 102 from the operating system, as well as interact with the user through a hardware and/or software framework provided by the operating system, as described below.

In some implementations, the computing system 102 includes functionality to obtain and/or execute applications using a network connection. In particular, the computing system 102 may obtain the web application 116 from one or more servers, e.g., server 1 104, using a network connection with the server(s) and load web application 116 in the web browser 110. For example, the web application 116 may be downloaded from an application server over the Internet by the web browser 110.

Once loaded, the web application 116 can provide features and user interactivity comparable to that of native applications on the computing system 102. For example, the web application 116 may function as an e-mail client, document editor, media player, computer-aided design (CAD) system, and/or computer game. The web application 116 can also include dynamic user interface elements such as menus, buttons, windows, sub-windows, icons, animations, and/or other graphical objects that emulate analogous user interface elements in native applications. The web application 116 may correspond to a rich Internet application (RIA).

Furthermore, the web application 116 can execute on computing system 102 regardless of the type of platform, e.g., operating system, drivers, hardware, associated with the computing system 102. Though platform-independent applications such as the web application 116 may be more portable and secure than native applications, such cross-platform applications may lack certain performance capabilities of native applications.

More specifically, non-native applications such as the web application 116 may be written using scripting languages that are interpreted rather than compiled, e.g., JavaScript. The interpreted nature of the web application 116 and/or other non-native applications may result in significantly slower execution times for the non-native applications than those of compiled native applications. Non-native applications may also be unable to use low-level libraries and/or application programming interfaces (API) that are available for use by native applications. Consequently, non-native applications may provide limited functionality in certain tasks.

To enable native performance for web applications, the computing system 102 can obtain and execute a native code module 118 within the plugin 108. Similar to the web application 116, the native code module 118 can be obtained from one or more servers, e.g., server 1 104, by the web browser 110. For example, the web application 116 can provide a hyperlink to the native code module 118 on the Internet. The web browser 110 can then download the native code module 118 from the Uniform Resource Locator (URL) specified in the hyperlink. Alternatively, the native code module 118 can be specified by the user or by an external source, for example, another web application and/or a native application. Furthermore, the native code module 118 can be obtained from local storage, e.g., a browser cache, on the computing system 102 instead of from a server.

More specifically, the native code module 118 may correspond to a software module containing native code that runs directly on hardware provided by the computing system 102, such as a CPU, e.g., ARM processor 122. As a result, the native code module 118 can be used to perform tasks that require substantial access to CPU resources on the computing system 102. For example, the native code module 118 may be used by the web application 116 to provide computationally intensive features associated with physics simulation, signal processing, artificial intelligence, modeling, flexible high-throughput cryptography, and/or multimedia editing and analysis.

In some implementations, the plugin 108 includes a variety of mechanisms to ensure the safe execution of the native code module 118. In particular, the native code module 118 may be validated by a validator 112 provided by the plugin 108 prior to execution. The validator 112 determines whether the code of the native client module 118 is compliant with one or more validation rules. If the validator 112 determines that the code is not compliant with the one or more validation rules, the validator 112 can reject the code such that the native module is not executed. For example, validation can include determining that the instructions in the native code module 118 do not include any restricted instructions and/or do not access restricted features of the computing system 102. Validation can also include determining that the set of instructions in the native code module 118 are aligned along byte boundaries such that a specified set of byte boundaries always contains a valid instruction and a set of control flow instructions in the native code module 118 have valid targets.

Once the native code module 118 is validated, the native code module 118 can be loaded into a secure runtime environment 114 provided by the plugin 108. In particular, the secure runtime environment 114 can be a sandbox environment. A sandbox is a managed environment in which a subset of the computer's resources is available. For example, the sandbox may have access to only one directory of disk memory, a pre-allocated memory buffer, and a subset of operating system or processor application programming interfaces (APIs). In particular, the sandbox environment provides a limited interface between the native code module 118 and other software entities and hardware resources. The interface moderates all external requests made by the native code module 118 as well as the way in which these requests are made. The secure runtime environment 114 can also be provided by a web browser extension to the web browser 110, and/or the secure runtime environment 114 can be built into the web browser 110.

Furthermore, because the native code module 118 may include binary code that runs directly on hardware, the native code module 118 can be platform-independent with respect to the operating system, the web browser 110, and/or other software components on the computing system 102.

However, the native code module 118 may not be platform-independent with respect to the instruction set architecture (ISA) of one or more processors, e.g., ARM processor 122, in the computing system 102. In particular, different ISAs may implement data types, instructions, registers, addressing modes, memory architecture, interrupt and exception handling, and/or external input/output (I/O) differently. Accordingly, instructions and mechanisms for executing software modules directly on hardware may vary between different ISAs.

Moreover, execution of the same software module within multiple ISAs may require that the software module be recompiled into a different binary executable for each ISA. For example, an x86 64-bit implementation of the native code module 118 may utilize 64-bit addresses, a flat segmentation model of memory, and 64-bit general-purpose registers (GPRs), while an x86 implementation of the native code module 118 may utilize 32-bit addresses, a multi-segment model of memory, and 32-bit GPRs.

Differences in ISA implementations may additionally affect security mechanisms used to validate and execute the native code module 118. More specifically, the security mechanisms described in the above-referenced applications for executing native code modules within x86 ISAs may not pertain to mechanisms for safely executing native code modules within x86 64-bit or ARM ISAs. Consequently, the functionality of the validator 112 and/or secure runtime environment 114 may require adaptation for use within a variety of ISAs.

In one or more implementations, the system of FIG. 1 includes functionality to safely execute the native code module 118 within an ISA with variable-length instruction encoding, e.g., ARM Thumb ISA. Thus, the plugin 108 and the web browser 110 may correspond to software modules that execute directly on the ARM processor 122 using the ARM Thumb ISA. Moreover, the native code module 118 may correspond to a set of variable-length instructions and data that is loaded into the address space of the ARM processor 122 and used to facilitate the execution of the web application 116.

As with native code modules in x86 environments, the secure execution of native code module 118 on ARM processor 122 using the ARM Thumb ISA may be facilitated by the validator 112 and/or the secure runtime environment 114. In particular, the validator 112 and the secure runtime environment 114 may enable safe execution of the native code module 118 on the Thumb ARM processor using a set of software fault isolation (SFI) mechanisms in place of hardware segmented memory support available in x86 ISAs. Such SFI mechanisms may maintain control flow integrity for the native code module 118 and/or constrain store instructions in native code module 118.

The validator 112 and the secure runtime environment 114 may also be configured to maintain security for native code modules within x86 64-bit ISAs.

In some implementations, the native code module 118 is loaded into memory of the computing system 102 for inspection by the validator 112. Once loaded into memory, page table protection provided by the operating system of the computing system 102 may prevent the native code module 118 from being modified. As discussed below with respect to FIG. 2, page table protection may additionally provide SFI mechanisms for restricting instruction execution in the native code module 118 to a code region in the address space and data accesses to the code region or a data region in the address space.

In some implementations, the validator 112 performs static binary analysis on the native code module 118 to ensure that the native code module 118 conforms to a set of security constraints. If the native code module 118 does not conform to the security constraints, the validator 112 may discard the native code module 118 prior to loading the native code module 118 into the secure runtime environment 114.

During analysis of the native code module 118, the validator 112 may ensure that the native code module 118 is statically linked at a start address of zero, e.g., providing a zero-based address range for the native code module 118, with the first byte of text at 128 Kbytes after the start address. The validator 112 may then sequentially disassemble and/or decode all executable instructions within the native code module 118, for example, beginning with the first byte of text at 64 kilobytes after the start address. During disassembly, the validator 112 may verify that the native code module 118 does not contain any "unsafe" or otherwise restricted instructions, such as instructions that directly invoke the operating system, hardware performance instructions, and/or complex addressing modes. As described in greater detail below, the validator 112 may also verify that data blocks within a code region associated with the native code module 118 begin with illegal instructions.

Once the native code module 118 is validated, the native code module 118 is executed in the secure runtime environment 114. As described above, the secure runtime environment 114 may load and launch the native code module 118 from memory; provide an execution environment that includes communications, threads, memory management, and debugging support for the native code module 118; moderate access to system resources according to an access policy for the native code module 118; and/or support the isolated execution of multiple native code modules on the computing system 102. Consequently, the secure runtime environment 114 may provide additional SFI mechanisms for ensuring the secure execution of the native code module 118 on the computing system 102. In particular, the secure runtime environment 114 may restrict access from the native code module 118 to registers, memory, and/or other resources associated with the ARM Thumb ISA.

As described above, the validator 112 and/or the secure runtime environment 114 may enforce security for the native code module 118 by providing pseudo-instructions that mask certain instructions within the native code module 118. In some implementations, pseudo-instructions are used to constrain both control flow instructions and store instructions within the ARM Thumb ISA. Furthermore, the SFI mechanisms provided by the validator 112 and/or the secure runtime environment 114 may ensure that all instructions within each pseudo-instruction are executed sequentially or not at all. Execution of pseudo-instructions within ARM Thumb ISAs is discussed in further detail below.

In some implementations, the validator 112 and/or the secure runtime environment 114 provide SFI mechanisms that enforce control flow integrity by restricting the execution of certain instructions, ensuring that data blocks are never executed, validating direct control flow instructions, and/or masking destination addresses associated with indirect control flow instructions. More specifically, the validator 112 may ensure that control flow instructions in the native code module 118 are restricted to branch-and-link (e.g., bl) instructions and branch-and-exchange (e.g., bx) instructions. Thus, the validator 112 may disable updates to program counter (PC or R15) using general register move instructions or load multiple (e.g., ldm) instructions. Alternatively, as described in greater detail below, program counter updates can be used to mask indirect control flow instructions. Such restrictions may simplify control flow analysis by the validator 112 with little to no performance impact during execution of the native code module 118. In addition, the validator 112 and/or the secure runtime environment 114 may ensure that data blocks within the code region associated with the native code module 118 are never executed.

Figure 2:
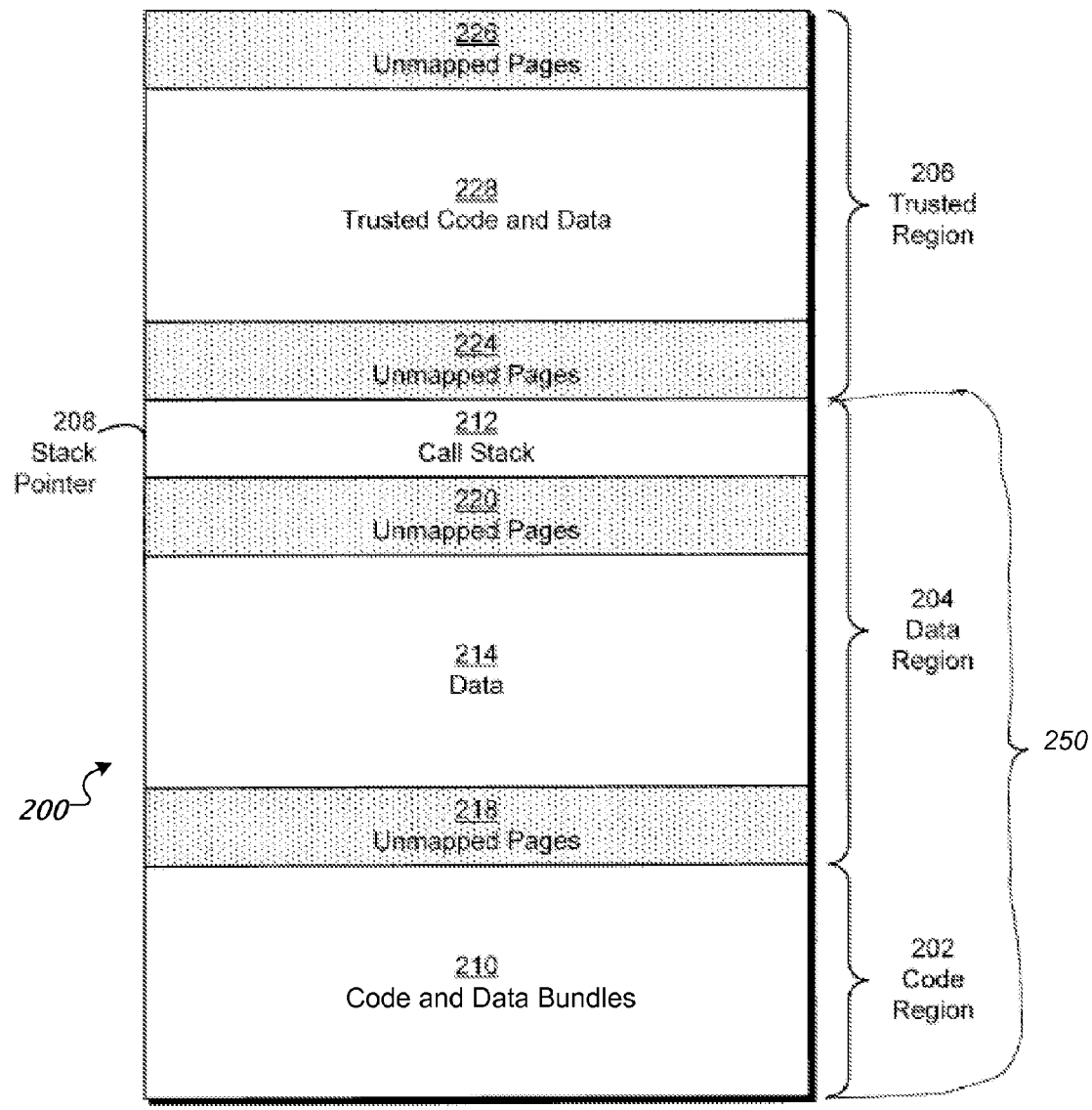
FIG. 2 shows an example address space structure for a secure runtime environment.

FIG. 2 illustrates an example address space structure for the secure runtime environment 114. In some implementations, the address space is a 32-bit address space of an ARM processor (e.g., ARM processor 122 of FIG. 1) into which a native code module (e.g., native code module 118 of FIG. 1) is loaded. As shown in FIG. 2, an address space 200 includes a native code module address space 250 divided into a code region 202, a data region 204, and a trusted region 206.

In some implementations, the code region 202 begins at address 0 and extends to an address that is a power of two (e.g., the first 256 megabytes of the address space). In some implementations, the code region 202 in divided into code and data bundles. The bundles can contain only code or a combination of code and data.

The data region 204 begins where the code region 202 ends and extends to an address that is a higher power of two (e.g., the first 2 Gbytes of the address space). Data region 204 may contain a call stack 212, data 214, and one or more unmapped pages 218 and 220. In some implementations, data region is divided into data blocks. In some other implementations, data region is not used and all data is stored in data tails of the bundles. Data tails are described in detail below.

Finally, the trusted region 206 occupies the remainder of the address space 200 (e.g., the last 2 Gbytes). The trusted region 206 may contain different unmapped pages 224 and 226. The unmapped pages 224 and 226 may bound trusted code and data 228 used to facilitate the execution of the native code module 118, such as code and data for the validator 112, the secure runtime environment 114, or trusted services associated with the native code module 118.

Figure 3A:
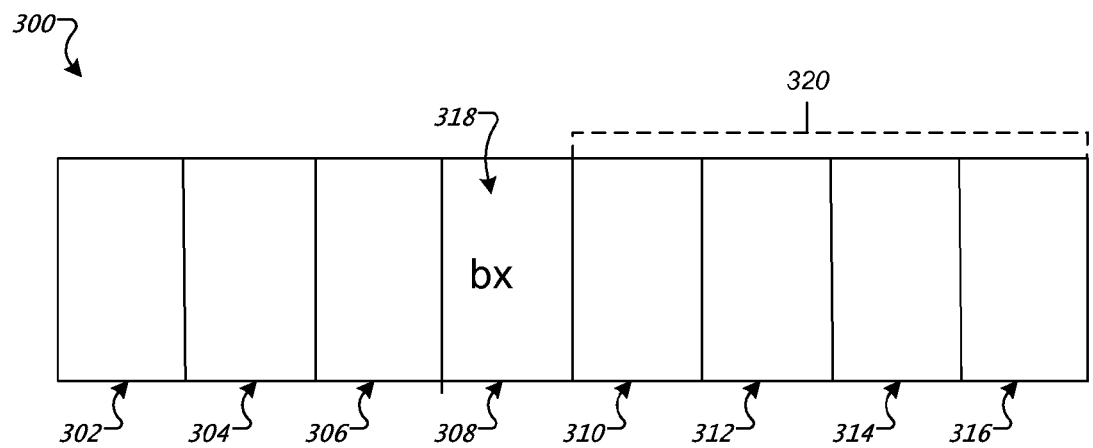
FIG. 3A shows schematic structure of an example 16-byte bundle with data tail.

FIG. 3A shows schematic structure of an example 16-byte bundle with data tail. The bundle provides one of SFI mechanisms provided to accommodate the use of variable-length instruction encoding (e.g., ARM Thumb), use the unused portions of the code and data bundles 210 for data storage, and prevent that data from being executed. The SFI mechanisms divide the code region into equally sized, aligned 16-byte bundles 300 of eight 2-byte slots, 302-316, and ensure that the first slot 302 of each bundle 300 contains the first 16 bits of a permitted instruction. In some implementations, the instruction bundles are aligned 14 mod 16 because of how OR instructions set low bits of addresses. As a result, all indirect branching is guaranteed to go to an address that is 14 mod 16 rather than 0 mod 16.

A permitted instruction is an instruction that does not compromise control flow integrity ensured by SFI mechanisms. The slots after the first slot 302 contain permitted instructions until a roadblock instruction (e.g., 318) is reached. A roadblock instruction is an unconditional control flow instruction that redirects execution flow away from a current location. For example, branch (b) instructions and branch-and-exchange (bx) instructions are roadblock instructions. Since a roadblock instruction is a permitted instruction, it can follow directly after the first permitted instruction, or a 16-byte bundle can start with a roadblock instructions.

The slots 310-316 after the roadblock instruction 318 form a data tail 320. A data tail is a portion of a bundle between a roadblock instruction and an end of the bundle. The data tail can be used to store data. The SFI mechanisms ensure that direct branch instructions do not address data tails of the bundles. In other implementations, the slots after the roadblock instruction 318 are unused.

Figure 3B:
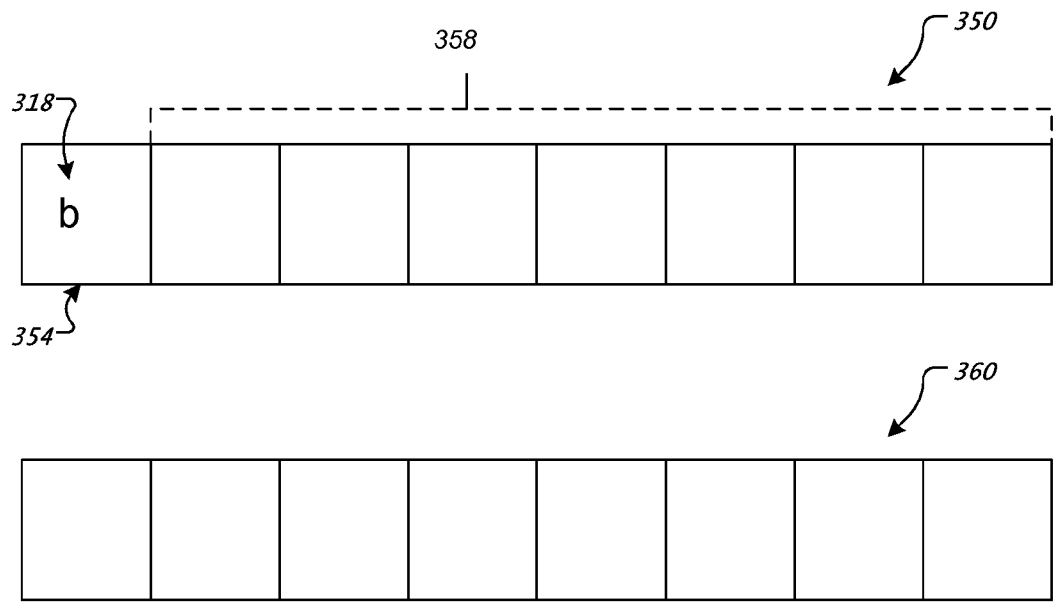
FIG. 3B shows schematic structure of an example data bundle.

In some implementations, when long strings of data need to be accommodated, data bundles can be used. FIG. 3B shows a schematic structure of an example data bundle 350. A data bundle is a bundle that begins with a slot containing a roadblock instruction. The rest of the slots in the bundle can be used as a data tail. The data bundle 350 starts with a roadblock instruction "b bundle 360" (352) in the first slot 354. The roadblock instruction 352 directs execution flow from the current bundle 350 to the next bundle 360. The slots between the roadblock instruction 352 and the end of the bundle 350 form a data tail 358. The slots of the data tail 358 contain only data and cannot be addressed by direct branches. The use of data bundles allows storage of data within a body of a function.

In some implementations, every instruction must fit completely within a single 16-byte bundle. All instructions that require more than one bundle are forbidden.

To validate direct control flow instructions, the validator 112 may statically compute direct control flow targets and confirm that the targets correspond to valid instructions. While loading the native code module 118 into memory, in order to validate indirect control flow instructions (e.g., instructions with targets computed at runtime), the validator 112 verifies that each indirect control flow instruction is a part of a statically safe sequence of instructions, also called a pseudo-instruction, that includes appropriate address masking operations. Such statically safe sequences of instructions are treated as atomic. A sequence of instructions is atomic if direct branches are not allowed to address any instruction of the sequence except the first, and, when conditional execution is used, all instructions in the sequence use the same predicate.

The size and position of the code region may allow for a more efficient implementation of SFI than unaligned memory regions and/or memory regions of other sizes. More specifically, the creation of a code region between address 0 and a power of 2 within the address space may allow masking to be accomplished using a single instruction and a variety of instructions and operands. For example, the indirect control flow pseudo-instruction may utilize any arithmetic or logical instruction(s) that clear the four highest and lowest bits in a register. Similarly, the same masking instructions may be used with modified operands to accommodate code regions of different sizes, as long as the sizes are powers of 2.

Such instructions and/or operands may further be selected for use in pseudo-instructions to minimize performance overhead during execution of native code module 118. In particular, the use of a logical-AND operation to mask addresses may introduce an overhead of about one instruction per masking operation if the size of the code region is a power of two. In other words, base-2 modular arithmetic may be used to efficiently implement masking in most 32-bit and 64-bit ISAs, while code regions of arbitrary sizes may preclude the use of base-2 modular arithmetic and require additional overhead in masking operations (e.g., from division operations). However, efficient implementations of non-base-2 arithmetic operations may allow masking operations to use such arithmetic operations. For example, an efficient implementation of base-10 modular arithmetic may allow the size of the code region to be a power of 10 and may introduce the use of base-10 arithmetic operations in masking operations.

In some implementations, the validator 112 and/or the secure runtime environment 114 include SFI mechanisms for constraining load and/or store instructions in the native code module 118. Such SFI mechanisms include the verification of pseudo-instructions and/or specific addressing modes within the native code module 118.

In some implementations, SFI mechanisms include at least one of the following pseudo-instructions: sfi_dmask, sfi_cmask, sfi_str; sfi_bx, sfi_blx, sfi_tbb, and sfi_tbh.

Sfi-Dmask sfi_dmask pseudo instruction ensures that an effective address of data used by an instruction is within the native code module address space 250 by clearing top two bits of the address. It is implemented as follows:

bic rTarget, #0xC0000000

In some implementations, only instructions attempting to alter stack pointer (SP or R13) are required to be masked with sfi_dmask.

In some implementations, only the following instructions can alter SP without masking: immediate indexed writeback from a load/store operation or a writeback by load/store multiple. Any other updates to SP must be immediately followed by an sfi_dmask pseudo-instruction.

Sfi-Cmask sfi_cmask pseudo instruction ensures that an effective address of code used by an instruction is within the native code module address space 250 by clearing top two bits of the address setting the low-order bits. It is implemented as follows:

bic rTarget, #0xC0000000
orr rTarget, #0x0000000F

In some implementations, only instructions attempting to alter link register (LR or R14) or program counter (R15) are required to be masked with sfi_cmask.

In some implementations, only indirect branch instructions, e.g., bx and blx, can alter LR without masking. Any other updates to LR must be immediately followed by an sfi_cmask pseudo-instruction.

Sfi_Str sfi_str pseudo-instruction replaces a write-to-memory (STR) instruction to ensure that the effective address of the STR instruction is within the native code module address space 250. It is implemented as follows:

tst rAddress, #0xC0000000
it eq
str eq rValue, [rAddress, #displacement]

sfi_str pseudo-instruction checks if top two bits of the address are clear. If the top two bits of the address are set, the pseudo-instruction alters the address to a value within the native code module address space 250.

Sfi_Bx/Sfi_Blx sfi_bx and sfi_blx pseudo-instruction ensures that indirect branch instructions, such as bx or blx, only address allowed portions of the native code module address space 250. sfi_bx or sfi_blx are required when the program attempts a highly unpredictable indirect branch. Also, since indirect branch instructions, such as bx or blx, are used to switch the processor between Thumb variable-length ISA mode and ARM set-length ARM mode, sfi_bx and sfi_blx are used to prevent the switching and to remain in Thumb ISA mode. sfi_bx is implemented as follows:

sfi_cmask rTarget
bx rTarget sfi_blx is executed as follows:

sfi_cmask rTarget
blx rTarget

Sfi_Tbb/Sfi_Tbh sfi_tbb and sfi_tbh instructions cause a forward branch using a table of single byte offsets (tbb) or halfword offsets (tbh). sfi_tbb allows up to 8 options. sfi_tbh allows up to 4. sfi_tbb can be executed as follows:

and rSelector, #limit
tbb [pc, rSelector]
.byte offset 0
.byte offset 1
...
.byte offset 7

Since 16-byte bundles must start with a permitted instruction, branch tables cannot be longer than 8 position in case of sfi_tbb, and no longer than 4 positions in case of sfi_tbh.

Other SFI mechanisms can be used to ensure safe execution of the native code module 118. Untrusted code from the native code module 118 is not permitted to alter register r9. Register r9 is reserved for use in thread local data accesses and provides a way to identify which thread is running on the processor as well as a way to obtain thread local storage addresses. In some alternative implementations, a different register can be used for these functions and similarly made unalterable by untrusted code. Any alterations to stack pointer (R13) must be a valid data address generated by a permitted form of such instruction as str or ldr (including push and pop). Otherwise, an unsafe instruction that updates the stack pointer must be followed by sfi_dmask pseudo-instruction. In some optional implementations, an alteration to link register (R14) must be a valid bundle address by bl or blx instructions or masked by sfi_cmask immediately after the improper alteration. A valid bundle address is an address of a first slot of a 16-byte bundle as described above.

If the validator 112 cannot ensure that an instruction in the native code module 118 will not call addresses outside the native code module address space 250, such instruction is forbidden. Also, instructions that cannot be checked statically by the validator 112 are forbidden. Such forbidden instructions include store instructions that compute the effective address by adding two registers, instructions that call an operating system, instructions that switch processor from Thumb to ARM ISA mode, instructions that load data into program counter (R15) or attempt to control program flow by performing arithmetic operations on content of register R15. In other implementations other types of instructions can also be forbidden.

If the validator 112 identifies that the native code module 118 compromises safe control flow, the validator 112 can reject this native code module in its entirety or in part. The validator can reject the native code module 118 if it identifies forbidden instructions in it, if there are branch instructions in the native code module 118 that address other than first instruction is a pseudo-instruction sequence or an inappropriate portion of a 16-byte bundle.

Figure 4:
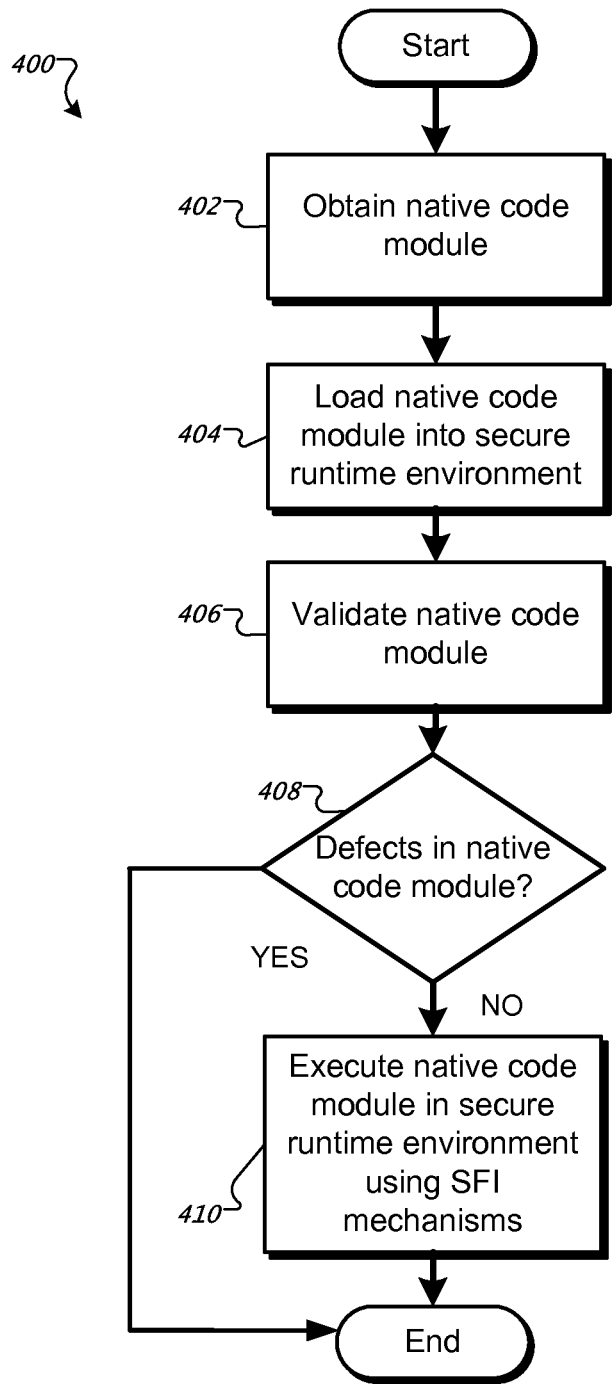
FIG. 4 shows a flowchart illustrating an example process of executing a native code module.

FIG. 4 shows a flowchart illustrating an example process of executing the native code module 118. In some implementations, one or more of the steps may be omitted, repeated, and/or performed in a different order. Accordingly, the specific arrangement of the steps shown in FIG. 4 should not be construed as limiting the scope of the invention.

First, the native code module 118 is obtained (402). The native code module 118 may be obtained from a server and/or compiled from source code. In addition, the native code module 118 may be used to facilitate the execution of a web application. For example, the native code module 118 may be used to perform computationally intensive operations for the web application.

Next, the native code module 118 is loaded into the secure runtime environment 114 for the Thumb ISA (404). In particular, the native code module 118 may be loaded into a valid memory region (e.g., code region 202 and data region 204 of FIG. 2) in the 32-bit address space of the Thumb ISA. The loaded native code module 118 is then validated (406) using one or more SFI mechanisms prior to executing the native code module 118. During validation, the native code module 118 may be inspected for conformity to a set of security constraints. In particular, the native code module 118 may be inspected to detect defects that do not conform to the security constraints (408). If the native code module 118 does not conform to the security constraints, e.g., the validator 112 detects defects in the native code, the native code module 118 is discarded without having been executed.

If the validator 112 does not detect defects in the native code module 118, the native code module 118 is executed in the secure runtime environment 114 using the SFI mechanisms (410). The secure runtime environment 114 may be provided by a plugin associated with the web browser, a browser extension to the web browser, and/or a component within the web browser. The SFI mechanisms may maintain control flow integrity for the native code module 118 and/or constrain store instructions in the native code module 118. To maintain control flow integrity, the SFI mechanisms may divide the code region into 16-byte blocks, enforce the use of pseudo-instructions, validate direct control flow instructions, disable attempts to switch away from Thumb instructions, mask destination addresses associated with indirect control flow instructions, and/or enforce storage of valid data addresses in a stack pointer.

Consequently, the SFI mechanisms used to validate and execute the native code module 118 may enable secure execution of variable length instructions encoded in the native code module 118 on ARM hardware, e.g., thumb 2, with low performance overhead while maintaining portability and platform independence across different web browsers and operating systems. In particular, the SFI mechanisms may provide per-thread protection that constrains threads used to execute untrusted code in the native code module 118 while allowing trusted code used to validate and execute the native code module 118 to execute without constraints. Furthermore, the SFI mechanisms may improve performance by minimizing overhead associated with masking store instructions. Finally, the direct execution of the native code module 118 on ARM hardware may allow the native code module 118 to execute on a variety of ARM processors and operating systems without modification.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for executing a native code module, comprising:
   obtaining the native code module, wherein instructions in the native code module are encoded by variable-length encoding;
   loading the native code module into a secure runtime environment for an ARM instruction set architecture; and
   safely executing the native code module in the secure runtime environment using software fault isolation (SFI) mechanisms by:
      constraining store instructions in the native code module;

maintaining control flow integrity for the native code module by dividing a code region associated with the native code module into 16-byte code blocks comprising 8 2-byte slots, wherein
> a first slot of each code block contains at least the first 16 bits of a permitted instruction; and
> when a particular code block includes a slot containing an unconditional control flow instruction, all instructions contained in slots between a first slot of the particular code block and the slot containing unconditional control flow instruction are permitted instructions.

2. The method of claim 1, wherein maintaining control flow integrity further comprises blocking exchange branch instructions intended for switching away from variable-length encoding mode.

3. The method of claim 1, wherein a portion of the particular code block between the unconditional control flow instruction and an end of the particular code block contains data.

4. The method of claim 3, wherein at least one of the code blocks is a data code block comprising 14 bytes of data and a two-byte branch instruction linking the data code block to another data code block.

5. The method of claim 1, further comprising validating the native code module wherein validator is configured to accommodate the instructions in the native code module encoded by the variable-length encoding by applying the software fault isolation (SFI) mechanisms to the native code module.

6. The method of claim 1, wherein safely executing the native code module further comprises at least one of following:
> preventing the instructions in the native code module from altering R9;
> allowing alterations to a stack pointer register only to a valid data address; and
> allowing alterations of a link register only to a valid bundle address.

7. The method of claim 1, wherein safely executing the native code module further comprises at least one of following:
> blocking instructions to compute an address by adding registers;
> blocking instructions to call an operating system;
> blocking instructions to switch away from variable-length encoding mode; and
> blocking instructions to load data into a program counter.

8. The method of claim 1, wherein safely executing the native code module further comprises replacing at least one of the following instructions with corresponding statically-safe sequences of instructions:
> write-to-memory instructions;
> indirect branch instructions; and
> table-offset branch instructions.

9. The method of claim 1, wherein safely executing the native code module further comprises at least one of the following:
> masking direct updates to a stack pointer register by clearing a set of upper bits in each of the destination addresses; and
> masking destination addresses associated with indirect control flow instructions by clearing a set of upper bits and a set of lower bits in each of the destination addresses.

10. A system comprising:
one or more computers configured to perform operations comprising:
> obtaining a native code module, wherein instructions in the native code module are encoded by variable-length encoding;
> loading the native code module into a secure runtime environment for an ARM instruction set architecture; and
> safely executing the native code module in the secure runtime environment using software fault isolation (SFI) mechanisms by:
>> constraining store instructions in the native code module;
>> maintaining control flow integrity for the native code module by dividing a code region associated with the native code module into 16-byte code blocks comprising 8 2-byte slots, wherein
>>> a first slot of each code block contains at least the first 16 bits of a permitted instruction; and
>>> when a particular code block includes a slot containing an unconditional control flow instruction, all instructions contained in slots between a first slot of the particular code block and the slot containing unconditional control flow instruction are permitted instructions.

11. The system of claim 10, wherein maintaining control flow integrity further comprises blocking exchange branch instructions intended for switching away from variable-length encoding mode.

12. The system of claim 10, wherein a portion of the particular code block between the unconditional control flow instruction and an end of the particular code block contains data.

13. The system of claim 12, wherein at least one of the code blocks is a data code block comprising 14 bytes of data and a two-byte branch instruction linking the data code block to another data code block.

14. The system of claim 10, further comprising validating the native code module wherein validator is configured to accommodate the instructions in the native code module encoded by the variable-length encoding by applying the software fault isolation (SFI) mechanisms to the native code module.

15. The system of claim 10, wherein safely executing the native code module further comprises at least one of following:
> preventing the instructions in the native code module from altering R9;
> allowing alterations to a stack pointer register only to a valid data address; and
> allowing alterations of a link register only to a valid bundle address.

16. The system of claim 10, wherein safely executing the native code module further comprises at least one of following:
> blocking instructions to compute an address by adding registers;
> blocking instructions to call an operating system;
> blocking instructions to switch away from variable-length encoding mode; and
> blocking instructions to load data into a program counter.

17. The system of claim 10, wherein safely executing the native code module further comprises replacing at least one of the following instructions with corresponding statically-safe sequences of instructions:
> write-to-memory instructions;
> indirect branch instructions; and
> table-offset branch instructions.

18. The system of claim 10, wherein safely executing the native code module further comprises at least one of the following:

masking direct updates to a stack pointer register by clearing a set of upper bits in each of the destination addresses; and masking destination addresses associated with indirect control flow instructions by clearing a set of upper bits and a set of lower bits in each of the destination addresses.

19. A non-transitory computer storage medium encoded with a computer program, the program comprising instructions that when executed by one or more computers cause the one or more computers to perform operations comprising:

obtaining a native code module, wherein instructions in the native code module are encoded by variable-length encoding;

loading the native code module into a secure runtime environment for an ARM instruction set architecture; and safely executing the native code module in the secure runtime environment using software fault isolation (SFI) mechanisms by:

constraining store instructions in the native code module;

maintaining control flow integrity for the native code module by dividing a code region associated with the native code module into 16-byte code blocks comprising 8 2-byte slots, wherein a first slot of each code block contains at least the first 16 bits of a permitted instruction; and when a particular code block includes a slot containing an unconditional control flow instruction, all instructions contained in slots between a first slot of the particular code block and the slot containing unconditional control flow instruction are permitted instructions.

\* \* \* \* \*